United States Patent

Ferrero et al.

Patent Number: 5,834,076
Date of Patent: Nov. 10, 1998

[54] CELLULOSE CASING FOR STUFFING MEAT PRODUCTS

[75] Inventors: Marino Diago Ferrero; Juan José Gato Peciña, both of Pamplona, Spain

[73] Assignee: Viscofan, Industria Navarra De Envolturas Celulosicas, S.A., Pamplona, Spain

[21] Appl. No.: 618,427

[22] Filed: Mar. 18, 1996

[30] Foreign Application Priority Data

Apr. 1, 1995 [ES] Spain ................................. 9500743

[51] Int. Cl.⁶ .................................................. A22C 13/00
[52] U.S. Cl. .................... 428/34.8; 428/36.9; 428/36.91; 428/195; 426/105; 426/129; 426/135; 426/412; 206/802; 138/118.1
[58] Field of Search ................................ 428/34.8, 195, 428/36.9, 36.91; 426/105, 135, 138, 129, 412, 383; 206/802; 138/118.1

[56] References Cited

U.S. PATENT DOCUMENTS

| | | | |
|---|---|---|---|
| 4,384,006 | 5/1983 | Wallick | 426/383 |
| 4,556,708 | 12/1985 | Andrae et al. | 426/105 |
| 4,781,931 | 11/1988 | Jon et al. | 426/135 |
| 4,917,924 | 4/1990 | Huang et al. | 428/348 |
| 5,032,416 | 7/1991 | Niaura et al. | 426/383 |
| 5,084,283 | 1/1992 | Oxley et la. | 426/87 |

*Primary Examiner*—Rena L. Dye
*Attorney, Agent, or Firm*—Notaro & Michalos, PC

[57] ABSTRACT

Such has discontinuous areas soaked in a proofing substance, preferably polyvinylidene chloride (PVDC) which is impermeable to both gases and liquids, and thereby on establishing areas representing a logotype, a text, an anagram or any other design with said proofing substance, when the cellulose casing is later filled with the meat emulsion, and the same is smoked or colored through the cellulose casing, the proofing substance will provide a barrier to such later soaking thereby for the smoke or coloring to cross only those areas of the cellulose casing which have not been treated with the proofing substance, that are then colored, providing a background upon which "printed devices" appear that are formally, dimensionally and positionally coincident with those existing on the cellulose casing, when the casing is finally removed, such "printed devices" being duly established upon the sausage proper.

34 Claims, 2 Drawing Sheets

CELLULOSE CASING FOR STUFFING MEAT PRODUCTS

OBJECT OF THE INVENTION

The present invention relates to a cellulose casing of the kind used as an "artificial skin" for stuffing meat products, and in particular for stuffing sausages, the casing having been especially devised to obtain a certain printed device on the finished food product, i.e. on the sausage, after removing said cellulose casing.

BACKGROUND OF THE INVENTION

An "artificial skin" or cellulose casing, obviously tubular in shape, filled with a meat emulsion to make the sausage, is used within the specific field of sausage making. The cellulose casing is supplied in great lengths that are folded into highly compressed pleats forming rigid tubes some 100 times shorter than the length of the casing when spread out, the rigid tube being couplable to the mouthpiece of the meat emulsion stuffer and unfolding at the same time as it is filled.

The cellulose casing filled with meat emulsion is portioned by being constricted at regular intervals and then undergoes a smoking, cooking and/or coloring stage for the sausage to be definitively formed, whereupon the cellulose casing is detached from the outer surface of the sausage obtained and disposed of.

Sausages are then grouped together as appropriate and packed generally in a vacuum or in brine, and the packages used therefor are usually provided with the printed device for the product to be commercially branded or identified.

Regardless of the printed devices that may or may not be provided on the sausage container-package, it is desirable for the sausages as such to be branded with certain printed devices having a pleasant or favourable impact upon consumers, for instance marks resembling those of a grill on a sausage or any decorative motif whatsoever, and of course the manufacturers own logotype or brand, conveying a warranty and quality pledge to the client.

This printed device on sausages which would appear to be simple to provide is in practice primarily impaired by the existence of a cellulose casing, that is essential to be able to make the sausage, and may be disposed of after the sausage has been made.

A solution to this problem is proposed in U.S. Pat. No. 4,384,006 where marks or printed devices are obtained on the sausage by punching the sausage. The problems posed by this solution lie on the one hand on the need to have supplementary and complex high-speed machinery in order for the operating speed of sausage production and the printing of devices to be equated. Punching on the other hand requires penetrating the thickness of the outer sausage skin, thereby posing a hygienic problem.

A solution affording better results is proposed in U.S. Pat. No. 4,917,924 which comprises using a cellulose casing that is provided with the printed device designed for the sausage, which print is later transferred onto the sausage surface. However, because the printed device may only be provided on the outer face of the cellulose casing, and yet in order for such print to be later transferred the print must be in contact with the sausage, the position of the cellulose casing must be inverted, i.e. turned around in order for the printed face to become the inner face, before or at the stuffing stage. Furthermore, transfer of the printed device yields a mirrored image of the basic print, not so an accurate reproduction thereof.

Classic prints made on the surface of cellulose casings are not a valid precedent either, because such prints are merely designed to identify the casings, or as appropriate the sausages, before being peeled, the print being by no means transferred onto the surface of the sausage, and hence the printed device disappearing fully after being peeled.

These prints are usually provided by mezzotint or flexography, the inks used being permeable to the passage of liquids or gases through them in order not to have any effect whatsoever on the potential treatment the sausages may need to undergo.

Furthermore and although the purpose is entirely different, as we shall see shortly, the use of substances soaking the cellulose casing to render it impermeable to the passage of gases and liquids, namely polyvinylidene, is also known, such that a perfectly uniform application of this substance on the surface of the cellulose casing brings about an impervious effect preventing the loss of water from the meat emulsion and hence a "wastage" of the product.

The proofing substance, i.e. polyvinylidene chloride (PVDC), is a commercial substance, marketed inter alia by the Dow Chemical Company under the "SARAN" trade mark and by Solvay & Cia. under the "IXAN SGA/1" trade mark.

SUMMARY OF THE INVENTION

The object of the cellulose casing for stuffing meat products proposed by the invention is to allow a device to be printed on the sausage proper arid, bearing in mind the prior art aforesaid, is mainly characterised by the provision of a proofing substance at least on certain parts of the casing surface, for instance polyvinylidene chloride as aforesaid, which obviously in this case loses its classic function of proofing the casing as a whole since it is not applied on the entire surface, affecting only those parts formally and dimensionally matching the design of the printed device to be obtained.

Now said proofing substance can obviously be replaced by polyamide, polyacrylonitrile, ethylene vinyl alcohol copolymer and other like substances.

Thus, once the sausage has been made using the appropriate cellulose casing, when it is smoked, provided with an outer coloring or other agent causing the meat emulsion to change colour, the effect will only appear through the permeable areas of the cellulose casing, viz. areas not previously treated with the proofing substance.

A color contrast is thus achieved between both parts of the sausage surface which in practice becomes a printed device thereon, suited to any design whatsoever.

With this basic construction, the proofed area can be impervious to gases only, to liquids only or to both, i.e. gases and liquids, printing may later be made by mezzotint, flexography, ink jet or otherwise using any conventional printing method, and the proofing substance may be assisted by a crosslinker enhancing its attachment to the cellulose casing material.

In accordance with another characteristic of the invention, the proofing substance, transparent per se, is designed to be duly pigmented to allow it to be viewed on the cellulose casing and hence forthwith to detect the printed device such casing is provided with.

The proofing substance has also been designed to have wax added to prevent self-adherence of said casing when folded, in areas where the proofing substance lies, being a substance that sticks easily under pressure or heat.

The proofing substance will be preferably applied onto the outer cellulose casing surface, but may also serve an identical purpose when applied onto its inner surface. This internal arrangement is easily achieved by printing on the outer casing surface and, logically, then inverting the cellulose casing by traditional means that are already known in prior art, the print provided thus lying on its inside.

Now clearly neither the proofing substance nor the pigmentation substance going through the cellulose casing are hazardous for human health and are consequently allowed by current health laws to come into contact with food products and particularly the meat emulsion making up the sausage.

Another method of achieving the same printing effect on the sausage surface and therefore an object of the invention, comprises continuously printing the cellulose casing with proofing substance, leaving gaps on the casing that may correspond to marks, logotypes, texts or anagrams, thereby for printing of the sausage as such to take place by the penetration of coloring and/or smoking agents through the casing at such points and not on the remaining surface that would be protected by the proofing substance. This method of printing a device on the surface of the sausage is the opposite of that specified in the first place albeit having a similar effect due to the contrast of color or pigment in both parts of the sausage. Printing is now based upon applying the proofing substance as a printed background, leaving the foreground or printed characters without this proofing substance, and hence when the cellulose casing with the meat inside undergoes smoking and/or coloring operations (collectively marking operations), it will only be penetrated through areas without the proofing substance, leaving the surface of such sausages marked by the areas without proofing substance.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 1:
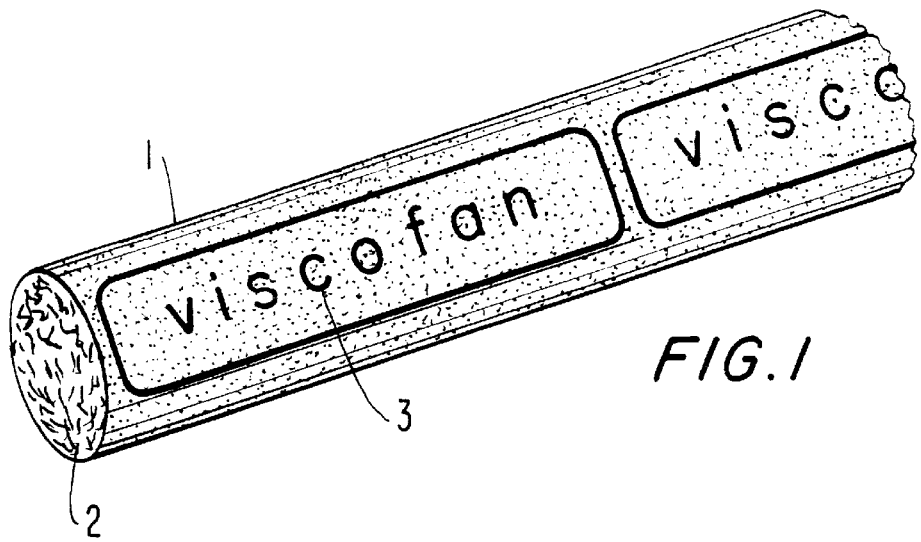
FIG. 1.—Shows a sausage still encased in the cellulose casing, and FIG. 1A a cross-sectional close-view of the casing made in accordance with a preferred embodiment of the invention, where the anagram, logotype or key has been printed with a proofing substance.
Figure 1A:
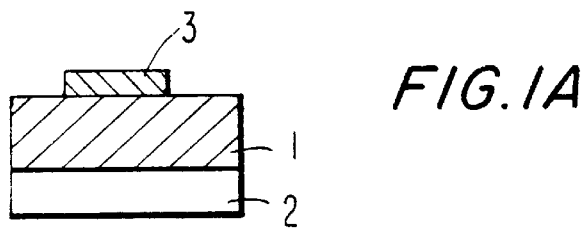

FIG. 1 shows a sausage (2) still encased in the cellulose casing (1), this being the situation prior to providing the constrictions required for the sausages to be rendered independent, an anagram, key or other mark having been printed with a proofing substance (3) on the casing to form a barrier to the passage of smoking and/or colouring agents (collectively, a marking agent). FIG. 1A shows a sectional close-view of part of the casing (1), part of the inner sausage (2) and the proofing print (3) provided thereon and making up an anagram, logotype, etc.

Figure 2:
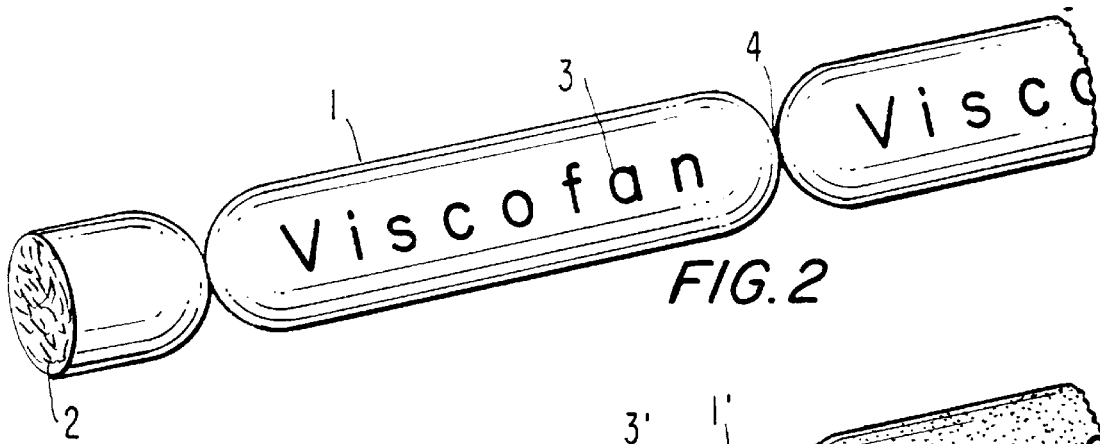
FIG. 2.—Shows a sausage still encased in the cellulose casing having the constrictions required for the individual sausages to be made, likewise having other discontinuous anagrams achieved by printing with the proofing substance.
Figure 3:
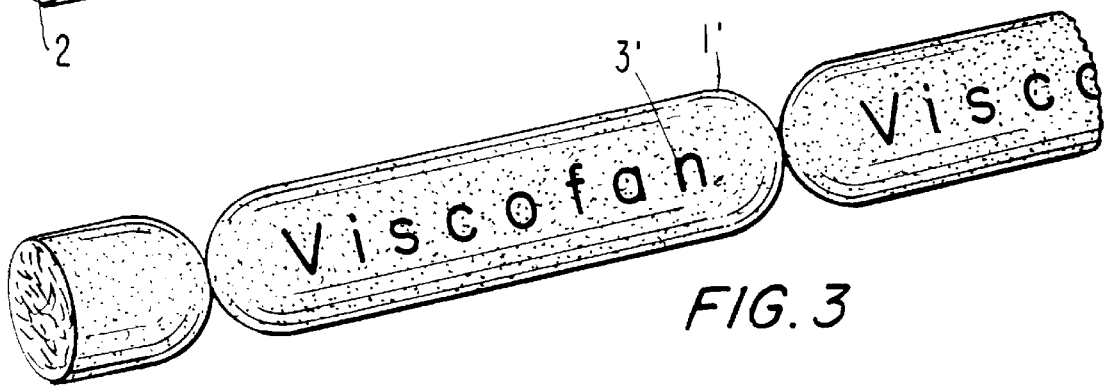
FIG. 3.—Shows the sausages obtained after the casing and sausage of FIG. 2 go through the smoking and/or coloring stage and after the removal of the casing.

The representation of FIG. 2 is very similar to that of FIG. 1, although said casing and hence the sausage have now been provided with consecutive constrictions (4). Printing is achieved by discontinuous forms or characters made with the proofing substance, FIG. 3 showing the results of printing (3') on a sausage (1'), with the area where the prints remaining without colouring or smoking agents, forming a perfect print of such marks, anagrams, logotypes, etc.

Figure 4:
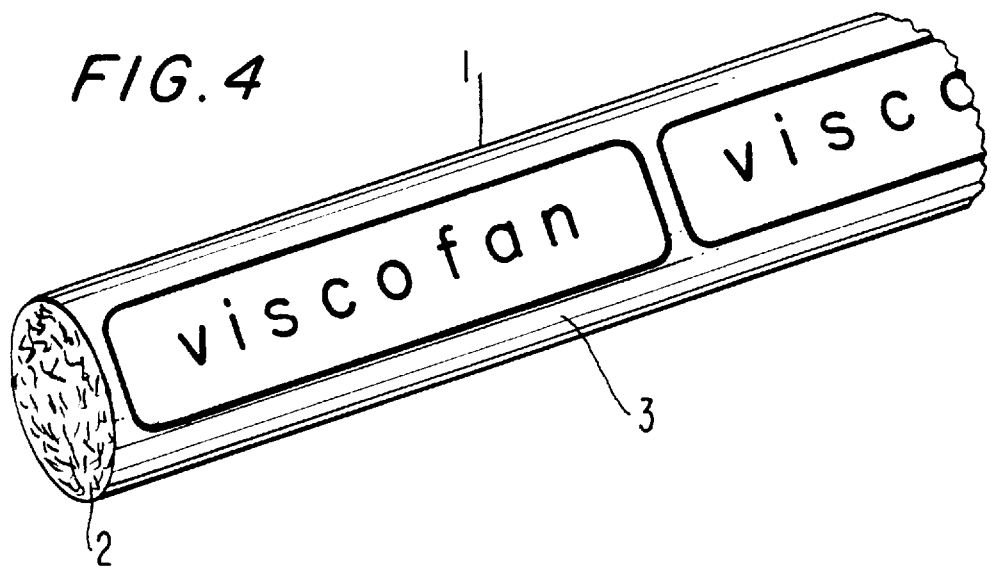
FIG. 4.—Shows another preferred embodiment of the invention, where the background of the casing has been printed with the proofing substance and the letters of the anagram, logotype, etc. are left without proofing, FIG. 4A being an enlarged sectional view of a portion of the casing.
Figure 4A:
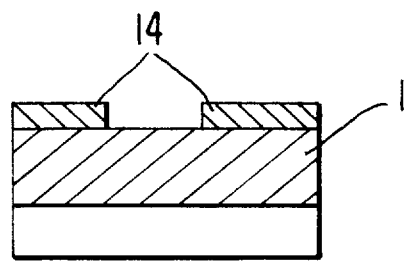

FIGS. 4 and 4A show a second method of achieving the transfer of logotypes, anagrams, etc. onto the surface of the sausage, being the opposite of that shown in FIG. 1. In this practical embodiment, a proofing substance (14) is applied to the background of the cellulose casing, and the letters, anagrams, etc. are now left without proofing substance, such letters, anagrams, etc. being provided on the gaps lying on the casing surface through which the smoking and/or coloring agent is transferred onto the sausage surface.

Liquid form polyvinylidene chloride (PVDC) is used as proofing substance, much like paint, for it provides an excellent barrier to the passage of water vapour and oxygen. PVDC is actually dissolved in ethyl acetate and has a blue pigment added to it.

More specifically, the solution used is 66% ethyl acetate with 17% PVDC, obtained by stirring gently, and 0.6% of the blue pigment (Irgalithe BLP blue from Cyba-Geigy) and 6.4% DEUTERON WAX TF, a micronised paraffin wax, are added whilst still stirring. The mixture is then stirred vigorously for 10 minutes. It is then stirred gently and 0.7% DEUTERON WAX TF and 9.3% crosslinker, for instance N,N', N"-tris (isocianate-hexamethylene) BIURET from Bayer Ag, dissolved in ethyl acetate, are then added. Viscosity is then adjusted with the same solvent at 20" copa Ford no. 4.

Given that PVDC, viz. polyvinylidene chloride, is a vinylidene chloride and vinyl chloride copolymer, its properties will vary according to the "vinyl/vinylidene" ratio and the comonomer used.

Depending upon its quality, PVDC oxygen permeability is known to vary from 13 $cm^3/m^2/24$ h to 1.6 $cm^3/m^2/24$ h, measured under a temperature of 23° C., relative humidity of 50% and a pressure of 1 atmosphere, whereas water permeability also varies, depending upon the quality of PVDC, between a value of 2.4 $g/m^2/24$ h to 0.3 $g/m^2/24$ h measured under a temperature of 38° C. (Source: the Dow Chemical Company).

We claim:

1. A cellulose casing for stuffing meat products, comprising a tubular body of indefinite length designed to receive meat emulsion during a stuffing stage to form a stuffed meat product, and to be removed after at least one of a subsequent smoking, cooking or coloring stage, the subsequent stage including at least one marking operation for applying a marking agent to the meat product, the casing comprising said tubular body having a single discontinuous layer of a proofing substance in a selected pattern for providing a barrier to the passage of the marking agent in the selected pattern to define a color contrast area on the surface of the meat product after the marking operation and after the removal of the cellulose casing to form the stuffed meat product with the color contrast area thereon.

2. A cellulose casing for stuffing meat products, as in claim 1, said proofing substance being impermeable to liquids.

3. A cellulose casing for stuffing meat products, as in claim 1, said proofing substance being impermeable to gases.

4. A cellulose casing for stuffing meat products, as in claim 1, said proofing substance being impermeable to liquids and gases.

5. A cellulose casing for stuffing meat products, as in claim 1, the proofing substance being printed by mezzotint.

6. A cellulose casing for stuffing meat products, as in claim 1, the proofing substance being printed by flexography.

7. A cellulose casing for stuffing meat products, as in claim 1, the proofing substance being printed by ink jet.

8. A cellulose casing for stuffing meat products, as in claim 1, the proofing substance being printed by any printing means.

9. A cellulose casing for stuffing meat products, as in claim 1, the proofing substance being polyamide.

10. A cellulose casing for stuffing meat products, as in claim 9, the polyamide carrying a crosslinker enhancing attachment to the cellulose of the casing proper.

11. A cellulose casing for stuffing meat products, as in claim 9, the polyamide carrying a wax preventing self-adherence of the proofing substance when the cellulose casing is folded.

12. A cellulose casing for stuffing meat products, as in claim 9, the polyamide carrying a pigment that provides it with a visible coloring.

13. A cellulose casing for stuffing meat products, as in claim 9, the proofing substance being polyamide that carries a crosslinker, a wax and a coloring.

14. A cellulose casing for stuffing meat products, as in claim 1, the proofing substance being polyacrylonitrile.

15. A cellulose casing for stuffing meat products, as in claim 14, the polyacrylonitrile carrying a crosslinker enhancing attachment to the cellulose of the casing proper.

16. A cellulose casing for stuffing meat products, as in claim 14, the polyacrylonitrile carrying a wax preventing self-adherence of the proofing substance when the cellulose casing is folded.

17. A cellulose casing for stuffing meat products, as in claim 14, the polyacrylonitrile carrying a pigment that provides it with a visible coloring.

18. A cellulose casing for stuffing meat products, as in claim 14 or 17, the proofing substance is polyacrylonitrile that carrying a crosslinker, a wax and a coloring.

19. A cellulose casing for stuffing meat products, as in claim 1, the proofing substance being ethylene vinyl alcohol copolymer (EVOH).

20. A cellulose casing for stuffing meat products, as in claim 19, the ethylene vinyl alcohol copolymer (EVOH) carrying a crosslinker enhancing attachment to the cellulose of the casing proper.

21. A cellulose casing for stuffing meat products, as in claim 19, the ethylene vinyl alcohol copolymer (EVOH) carrying a wax preventing self-adherence of the proofing substance when the cellulose casing is folded.

22. A cellulose casing for stuffing meat products, as in claim 19, the ethylene vinyl alcohol copolymer (EVOH) carrying a pigment that provides it with a visible coloring.

23. A cellulose casing for stuffing meat products, as in claim 19, the proofing substance is ethylene vinyl alcohol copolymer (EVOH) that carrying a crosslinker, a wax and a coloring.

24. A cellulose casing for stuffing meat products, as in claim 1, the pattern makes up a logotype, text or anagram.

25. A cellulose casing for stuffing meat products, as in claim 1, the proofing substance being located on the inner face of said cellulose casing.

26. A cellulose casing for stuffing meat products, as in claim 1, wherein the pattern being visible on the cellulose casing proper.

27. A cellulose casing for stuffing meat products, as in claim 1, wherein the pattern is a printing background, leaving casing portions making up a logotype, text or anagram without proofing substance, such areas being suitable for penetration of the marking agent, thereby achieving a direct marking at such portions lying at areas having no proofing substance.

28. A sausage made with the cellulose casing in accordance with claims 1 to 27.

29. A cellulose casing for stuffing meat products, comprising a tubular body of indefinite length designed to receive meat emulsion during a stuffing stage to form a stuffed meat product, and to be removed after at least one of a subsequent smoking, cooking or coloring stage, the subsequent stage including at least one marking operation for applying a marking agent to the meat product, the casing comprising said tubular body having a single discontinuous layer of a proofing substance in a selected pattern for providing a barrier to the passage of the marking agent in the selected pattern to define a color contrast area on the surface of the meat product after the marking operation and after the removal of the cellulose casing to form the stuffed meat product with the color contrast area thereon, the proofing substance being polyvinylidene chloride (PVDC).

30. A cellulose casing for stuffing meat products, as in claim 29, the polyvinylidene chloride (PVDC) carrying a crosslinker enhancing attachment to the cellulose of the casing proper.

31. A cellulose casing for stuffing meat products, as in claim 29, the polyvinylidene chloride (PVDC) carrying a wax preventing self-adherence of the proofing substance when the cellulose casing is folded.

32. A cellulose casing for stuffing meat products, as in claim 29, the polyvinylidene chloride (PVDC) carrying a pigment that provides it with a visible coloring.

33. A cellulose casing for stuffing meat products, as in claim 29, the proofing substance being polyvinylidene chloride (PVDC) that carries a crosslinker, a wax and a coloring.

34. A cellulose casing for stuffing meat products, comprising a tubular body of indefinite length designed to receive meat emulsion during a stuffing stage to form a stuffed meat product, and to be removed after at least one of a subsequent smoking, cooking or coloring stage, the subsequent stage including at least one marking operation for applying a marking agent to the meat product, the casing comprising said tubular body having a single discontinuous layer of a proofing substance in a selected pattern for providing a barrier to the passage of the marking agent in the selected pattern to define a color contrast area on the surface of the meat product after the marking operation and after the removal of the cellulose casing to form the stuffed meat product with the color contrast area thereon, the proofing substance being located on the outer face of said cellulose casing.

* * * * *